United States Patent
Chuang

(10) Patent No.: US 11,167,813 B2
(45) Date of Patent: Nov. 9, 2021

(54) QUICK RELEASE BUCKLE DEVICE FOR A BICYCLE SADDLE BAG

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 0 days.

(21) Appl. No.: 17/114,710

(22) Filed: Dec. 8, 2020

(65) Prior Publication Data
US 2021/0221458 A1 Jul. 22, 2021

(30) Foreign Application Priority Data

Jan. 20, 2020 (TW) ................. 109101957

(51) Int. Cl.
*B62J 7/02* (2006.01)
(52) U.S. Cl.
CPC ....................... *B62J 7/02* (2013.01)
(58) Field of Classification Search
CPC ......... B62J 9/00; B62J 9/20; B62J 9/21; B62J 9/23; B62J 9/26; B62J 9/27; B62J 7/08; B62J 7/02; B62J 7/04; B62J 11/00
See application file for complete search history.

(56) References Cited

U.S. PATENT DOCUMENTS

| 3,784,140 | A | | 1/1974 | Auerbach | |
|---|---|---|---|---|---|
| 5,579,971 | A | * | 12/1996 | Chuang | B62J 7/04 224/430 |
| 5,673,833 | A | * | 10/1997 | Ortlieb | B62J 9/00 224/425 |
| 6,095,473 | A | * | 8/2000 | Engers | B62J 9/00 224/425 |
| 8,292,139 | B2 | * | 10/2012 | Golub | B62J 7/08 224/419 |
| 8,944,303 | B1 | * | 2/2015 | Campbell | B62J 9/26 224/430 |
| 2009/0308903 | A1 | * | 12/2009 | Vigeant | B62J 7/08 224/431 |
| 2010/0108729 | A1 | | 5/2010 | Golub et al. | |
| 2020/0370576 | A1 | * | 11/2020 | Adler | F16B 2/10 |

FOREIGN PATENT DOCUMENTS

| CN | 101125565 A | 2/2008 |
|---|---|---|
| DE | 102015008780 B4 | 1/2017 |
| TW | M362159 U | 8/2009 |
| TW | M362804 U | 8/2009 |

* cited by examiner

*Primary Examiner* — Corey N Skurdal
(74) *Attorney, Agent, or Firm* — Karin L. Williams; Alan D. Kamrath; Mayer & Williams PC

(57) ABSTRACT

A quick release buckle device comprises a hanger seat and a limiting unit. The hanger seat includes a first pivotal portion and is connected to a first hook. The limiting unit includes a first stopper and a first pin. An end of the first stopper is pivotably mounted to the first pivotal portion. The first stopper is swayable between a first stop position and a first release position. The first pivotal portion has a first sliding groove. The first stopper has a second sliding groove at a non-parallel angle to the first sliding groove. The first pin is slidably received in the first and second sliding grooves.

10 Claims, 14 Drawing Sheets

QUICK RELEASE BUCKLE DEVICE FOR A BICYCLE SADDLE BAG

BACKGROUND OF THE INVENTION

The present invention relates to a quick release buckle device and, more particularly, to a quick release buckle device for a bicycle saddle bag. Taiwan Utility Model No. M362159 discloses a buckle unit structure for a bicycle side bag. The buckle unit structure includes a hook seat and a clamping seat fixed to upper and lower portions of a bag. The hook seat includes a base having two hanger hooks on two sides thereof, respectively. A movable hook is disposed between the two hanger hooks. The hook seat can, thus, be fixed to a lateral rod of a rear rack of a bicycle by hooking. Furthermore, the clamping seat at the lower side includes a horizontal beam having an axial hole in a central portion thereof. A coupling rod is coupled in the axial hole and is rotatable along a longitudinal axis of the axial hole. The coupling rod can be used to clamp supporting rods of the rear rack.

However, a pressing portion of the hook seat must be pressed to release the movable hook every time the buckle unit is to be buckled on the bicycle rack, and the coupling rod must be rotated to hook the rear rack and then rotated back. Namely, many steps of operation are required to smoothly couple the buckle unit on the rack, which is relatively troublesome in use.

Thus, a need exists for a novel quick release buckle device for a bicycle saddle bag to mitigate and/or obviate the above drawbacks.

BRIEF SUMMARY OF THE INVENTION

An objective of the present invention is to provide a quick release buckle device for a bicycle saddle bag. The quick release buckle device comprises a hanger seat and a limiting unit. The hanger seat includes a first pivotal portion. A first hook includes a first end connected to the hanger seat and a second end opposite to the first end. A first hanging section is formed between the second end of the first hook and the first pivotal portion. The limiting unit includes a first stopper and a first pin. The first stopper includes a first end pivotably mounted to the first pivotal portion about a rotating axis and a second end. The second end is opposite to the first pivotal portion, is disposed on the first hanging section, and is swayable between a first stop position and a first releasing position. The first pivotal portion has a first sliding groove. The first stopper has a second sliding groove at a non-parallel angle to the first sliding groove. The first pin extends in a direction parallel to the rotating axis and is slidably received in the first and second sliding grooves and. The first stopper is adjacent to the first hook when the first stopper is in the first stop position. The first stopper is away from the first hook when the first stopper is in the first releasing position.

In an example, the first pivotal portion has two first lateral boards and a first pivot. The first stopper is pivotably mounted between the two first lateral boards. The first pivot extends along the rotating axis L and extends through the two first lateral boards and the first stopper. The first sliding groove extends through the two first lateral boards. The first pin extends through the two first lateral boards.

In an example, a releasing member is slidably mounted on the hanger seat and is connected to the first pin. The first pin moves together with the releasing member when the releasing member slides. The first stopper moves to the first stop position when the first pin moves to ends of the first and second sliding grooves and adjacent to the rotating axis. The first stopper moves to the first releasing position when the first pin moves to ends of the first and second sliding grooves remote to the rotating axis.

In an example, the hanger seat includes at least one return member which is elastic. An end of the at least one return member abuts against the hanger seat. Another end of the at least one return member abuts against the releasing member. The at least one return member is capable of pushing the releasing member to move the first stopper towards the first stop position via the first pin.

In an example, the first sliding groove extends perpendicularly to the rotating axis, and the second sliding groove is at a non-parallel angle to the longitudinal axis.

In an example, the hanger device includes a second pivotal portion. A second hook has a first end connected to the hanger seat and a second end opposite to the first end. A second hanging section is formed between the second end of the second hook and the second pivotal portion. The limiting unit includes a second stopper and a second pin. The second stopper includes a first end pivotably mounted to the second pivotal portion about the rotating axis and a second end. The second end is opposite to the second pivotal portion, is disposed on the second hanging section, and is swayable between a second stop position and a second releasing position. The second pivotal portion has a third sliding groove. The second stopper has a fourth sliding block. The third sliding groove extending perpendicularly to the rotating axis. The fourth sliding groove is at a non-parallel angle to the rotating axis. The second pin extends in a direction parallel to the rotating axis L and is slidably received in the third and fourth sliding grooves. The second stopper is adjacent to the second hook when the second stopper is in the second stop position. The second stopper is away from the second hook when the second stopper is in the second releasing position. The second pivotal portion has two second lateral boards and a second pivot. The second stopper is pivotably mounted between the two second lateral boards. The second pivot extends through the two second lateral boards and the second stopper. The third sliding groove extends through the two second lateral boards. The second pin extends through the two second lateral boards. The releasing member is disposed between the first and second pivotal portions. An end of the releasing member opposite to the first pivotal portion is connected to the second pin. The second pin moves together with the releasing member when the releasing member slides. The second stopper moves to the second stop position when the second pin moves to ends of the third and fourth sliding grooves adjacent to the rotating axis. The second stopper moves to the second releasing position when the second pin moves to ends of the third and fourth sliding grooves remote to the rotating axis. The at least one return member is capable of pushing the releasing member to move the second stopper towards the second stop position via the second pin.

In an example, the first hook is connected to a first pad disposed on a side of the first hook adjacent to the first pivotal portion. An end of the first stopper is connected to a second pad adjacent to the first hook. The second hook is connected to a third pad disposed on a side of the second hook adjacent to the second pivotal portion. An end of the second stopper is connected to a fourth pad adjacent to the second hook.

In an example, the quick release buckle device further comprises a sliding seat, a first sliding block, and a second sliding block. The sliding seat includes a first side and a second side opposite to the first side. The sliding seat includes a slot extending from the first side through the second side. The slot has a first coupling portion facing the first side. The first sliding block is slidably received in the slot via the first side. The first sliding block includes a second coupling portion and a third coupling portion. The second coupling portion releasably abuts against the first coupling portion. The first sliding block is not movable relative to the sliding seat when the second coupling portion abuts against the first coupling portion. The first sliding block is movable relative to the sliding seat when the second coupling portion disengages from the first coupling portion. The second sliding block is slidably received in the slot via the second side and is connected to the first sliding block. The second sliding block includes a fourth coupling portion releasably abutting against the third coupling portion. The second sliding block is not rotatable relative to the first sliding block when the fourth coupling portion abuts against the third coupling portion. The second sliding block is rotatable relative to the first sliding block when the fourth coupling portion disengages from the third coupling portion.

In an example, the slot includes two coupling flanges protruding from two opposite sides thereof. The two coupling flanges are adjacent to the second side. The second sliding block includes an outer periphery having a coupling groove therearound. The two coupling flanges are disposed in the coupling groove.

In an example, the first sliding block is connected to a button extending through the second sliding block and exposed beyond an end of the second sliding block opposite to the first sliding block. When the button is pressed, the second coupling portion disengages from the first coupling portion, and the fourth coupling portion disengages from the third coupling portion. The third coupling portion is disposed on an end of the first sliding block adjacent to the second sliding block. The third coupling portion surrounds the button. The fourth coupling portion is disposed to an end of the second sliding block adjacent to the first sliding block. The fourth coupling portion surrounds the button. The button includes a first end having a connecting portion connected to the first sliding block. The button includes a second end opposite to the connecting portion and having a head. The head is exposed beyond the end of the second sliding block opposite to the first sliding block. The head has a width larger than a width of the connecting portion. An elastic element is mounted around the button and has a first end abutting the second sliding block and a second end abutting the head.

DETAILED DESCRIPTION OF THE INVENTION

Figure 1:
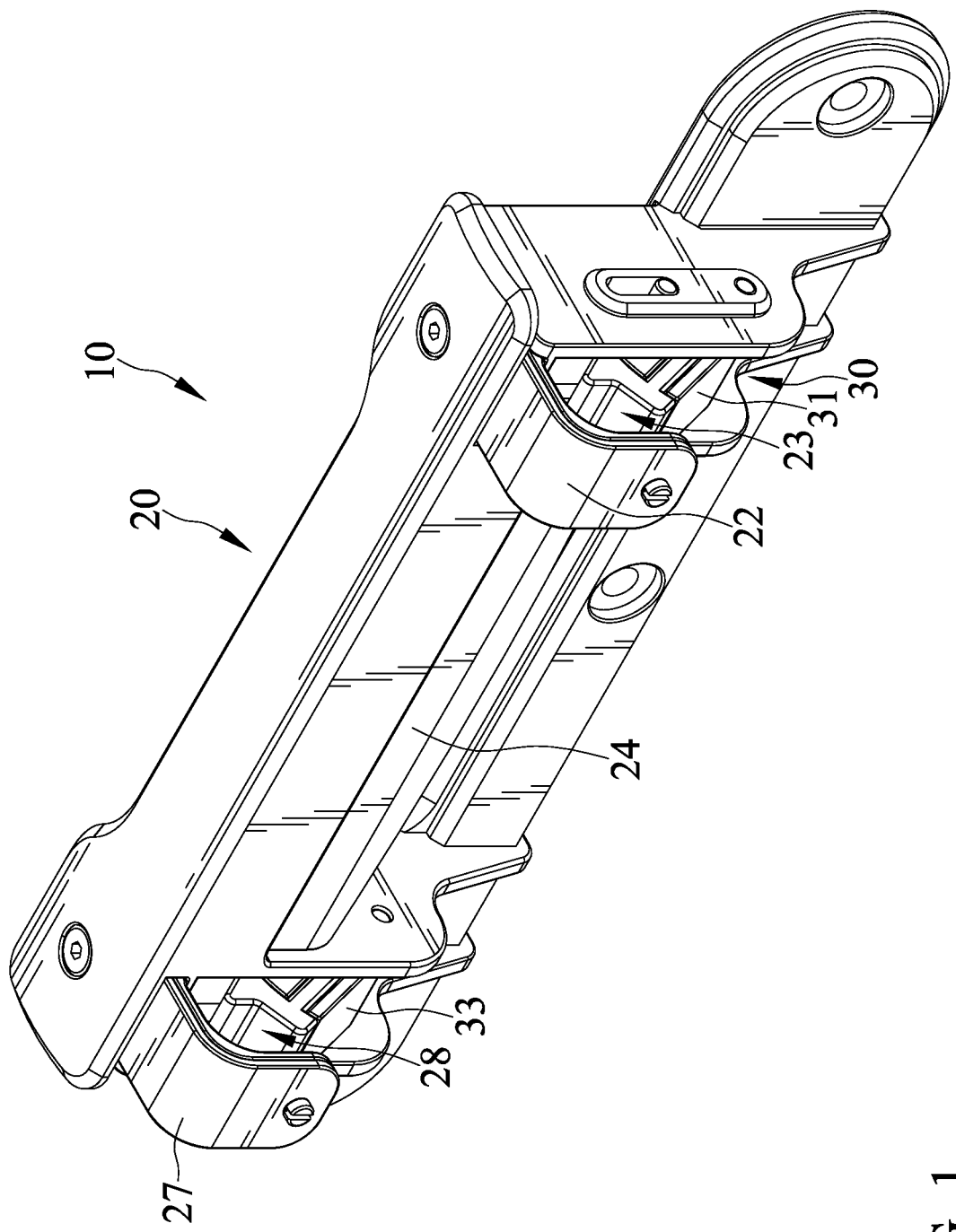
FIG. 1 is a perspective view of a hanger seat and a limiting unit of a quick release buckle device for a bicycle saddle bag of an embodiment according to the present invention.
Figure 2:
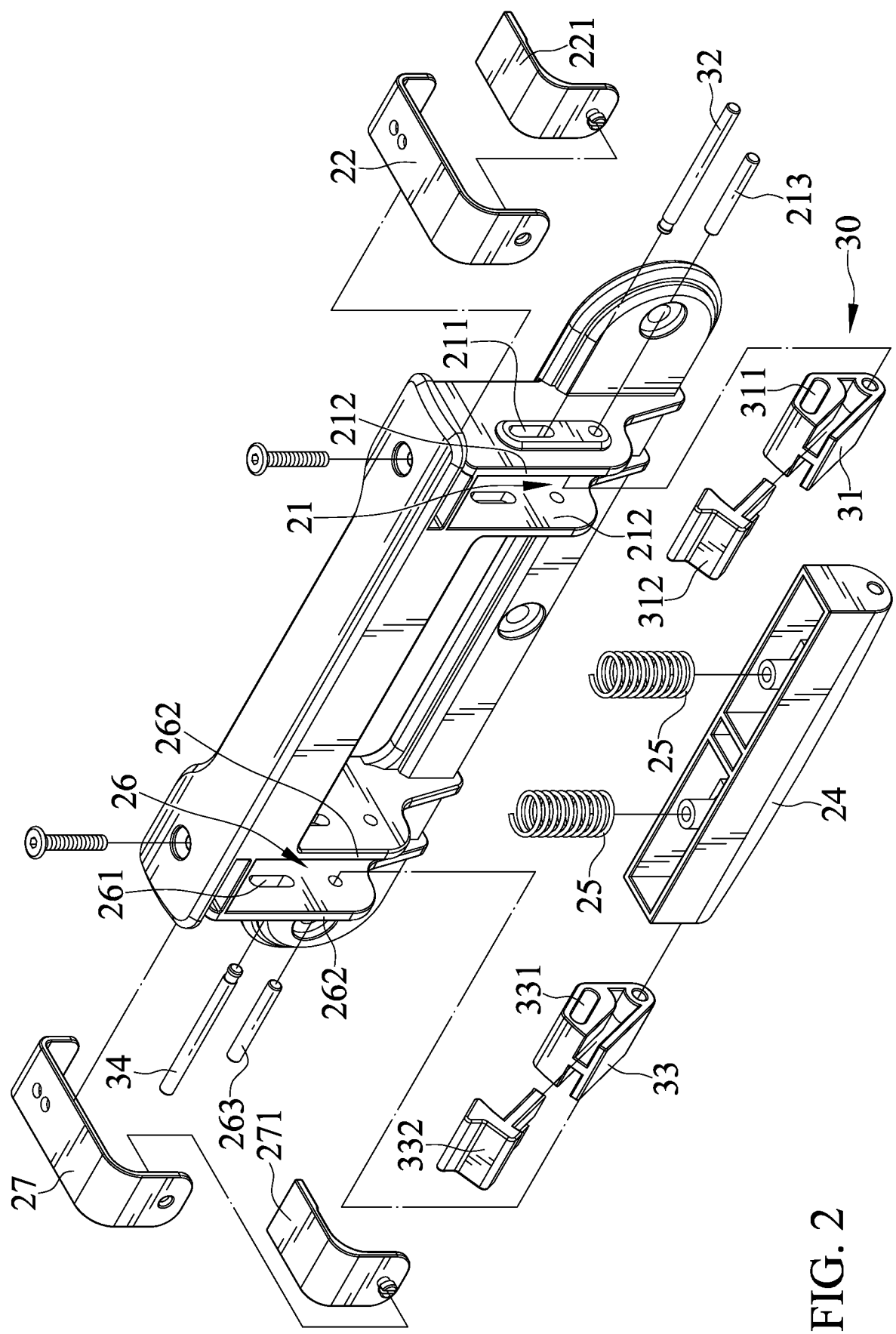
FIG. 2 is an exploded, perspective view of the quick release buckle device of FIG. 1.
Figure 3:
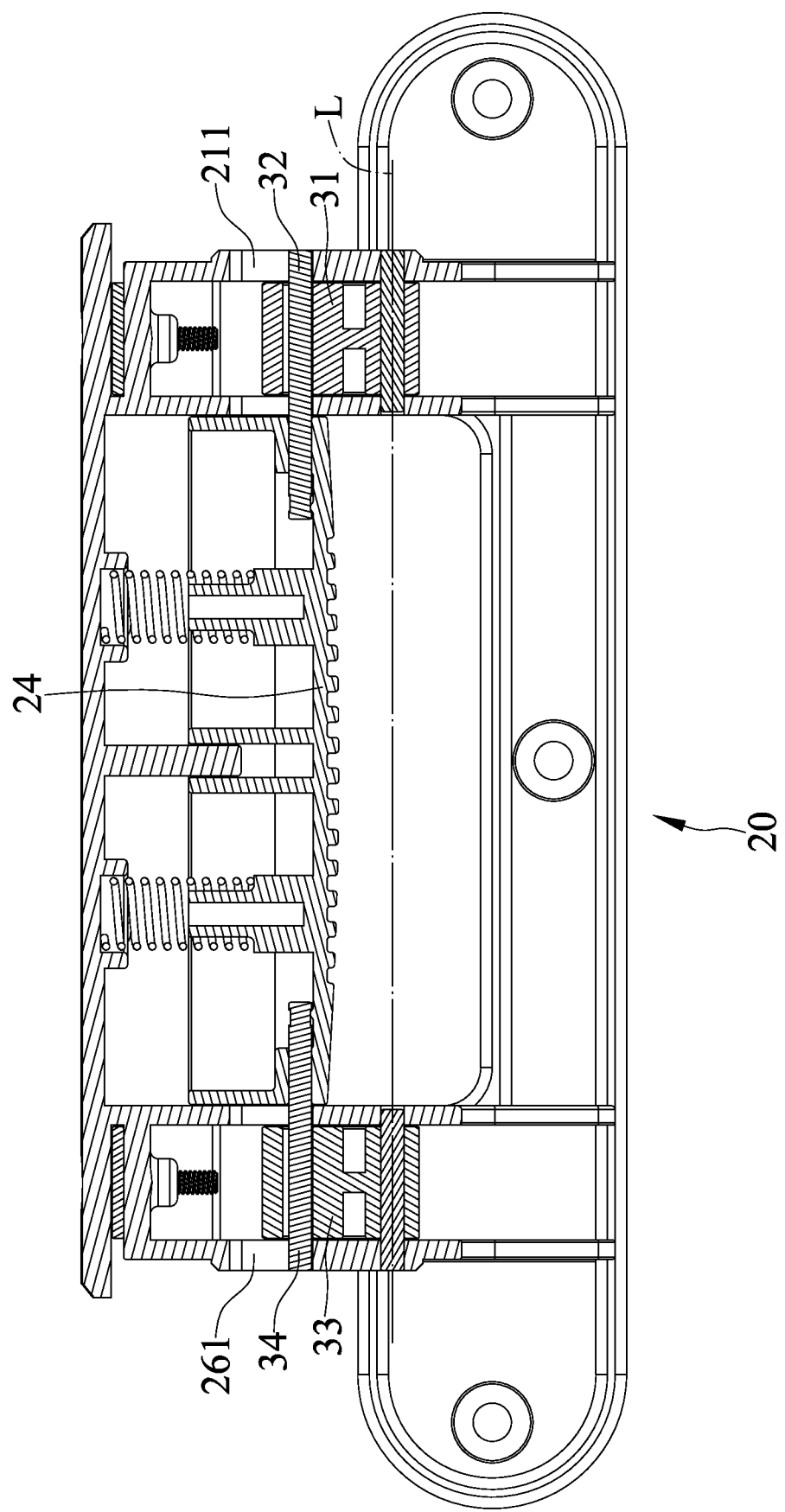
FIG. 3 is a cross sectional view of the quick release buckle device of FIG. 1.
Figure 4:
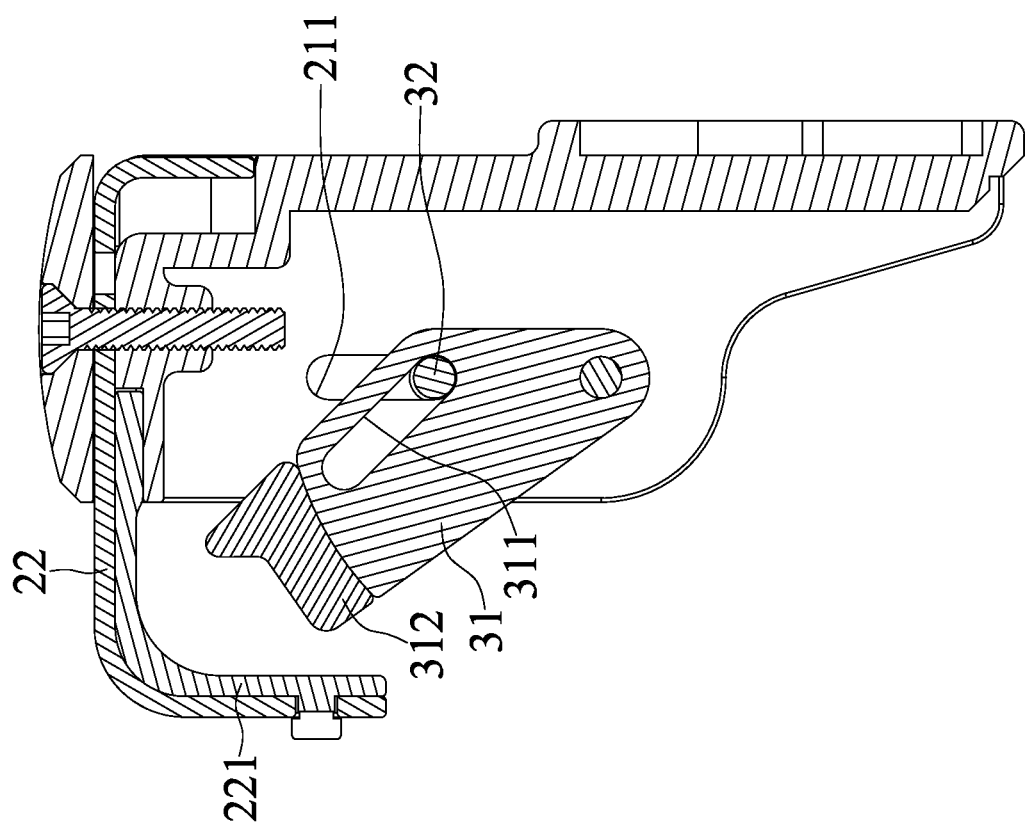
FIG. 4 is another cross sectional view of the quick release buckle device of FIG. 1.
Figure 5:
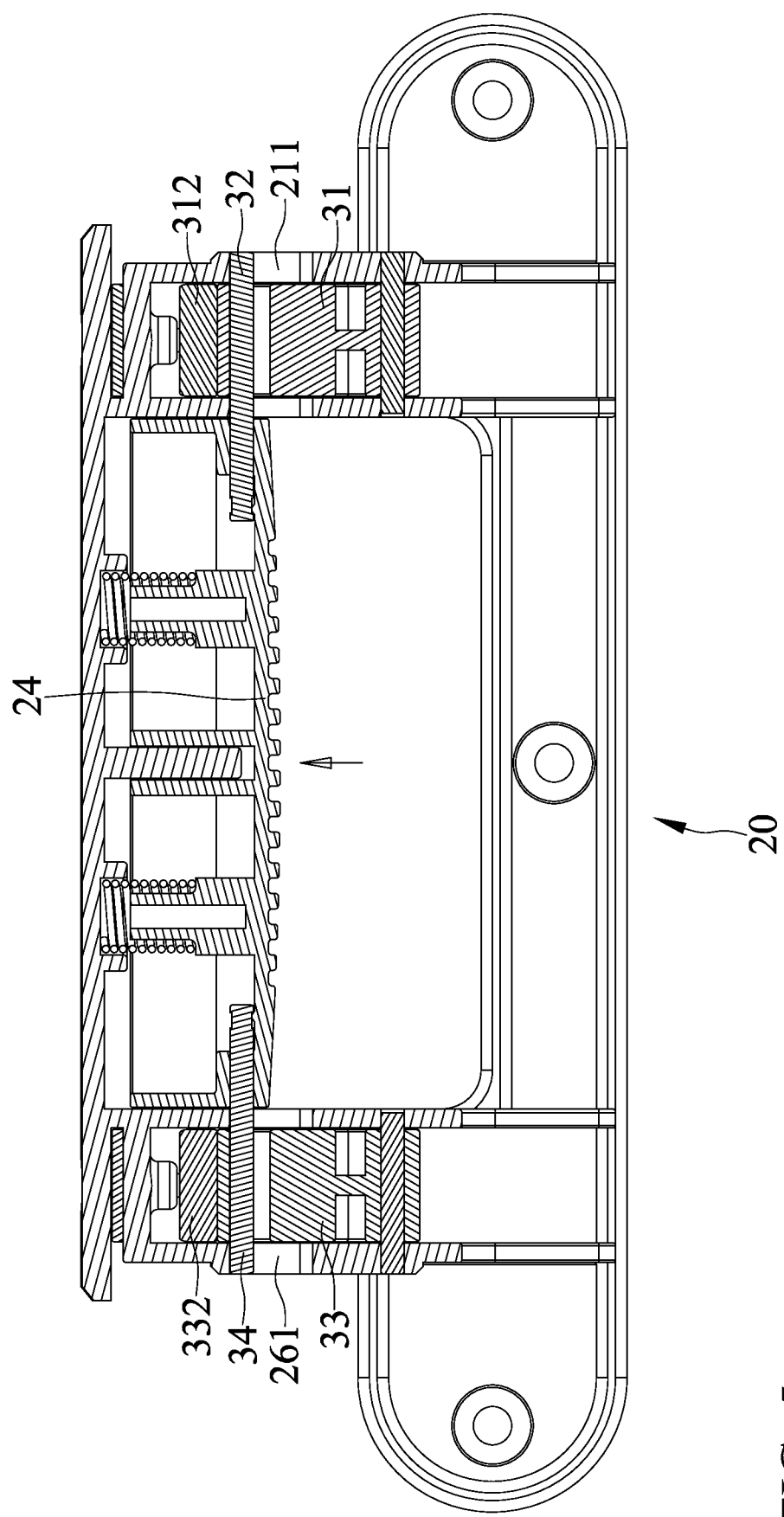
FIG. 5 is a view similar to FIG. 3 with a first stopper located in a first releasing position.
Figure 6:
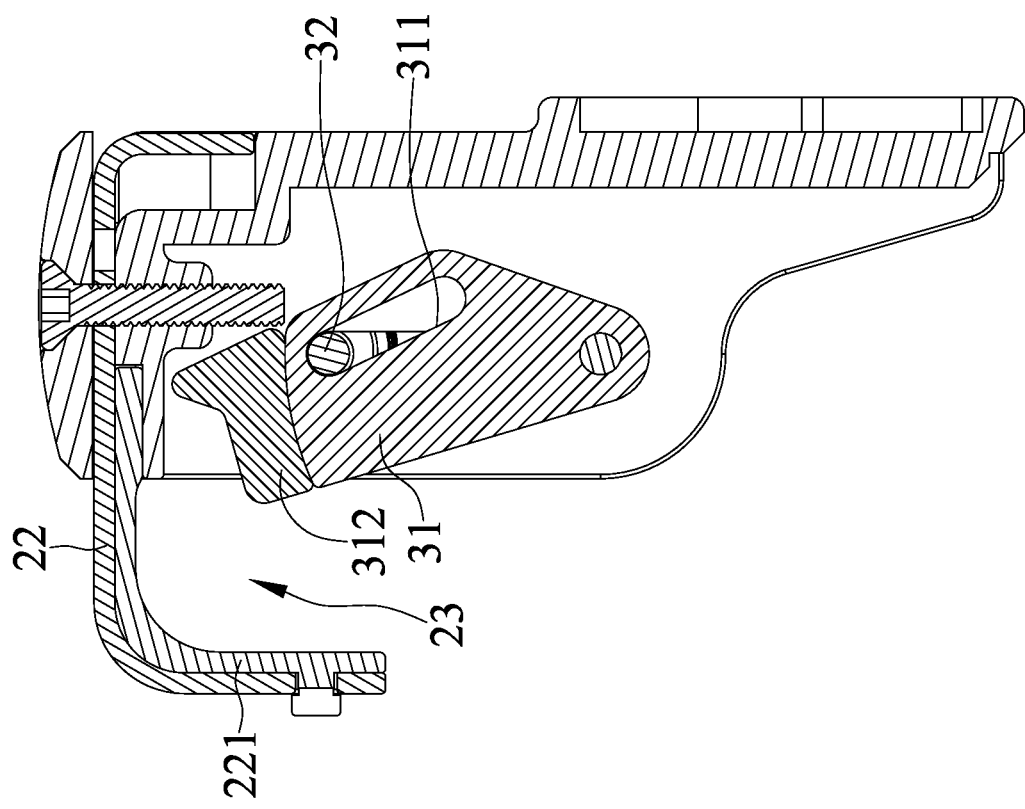
FIG. 6 is a view similar to FIG. 4 with the first stopper located in the first releasing position.
Figure 7:
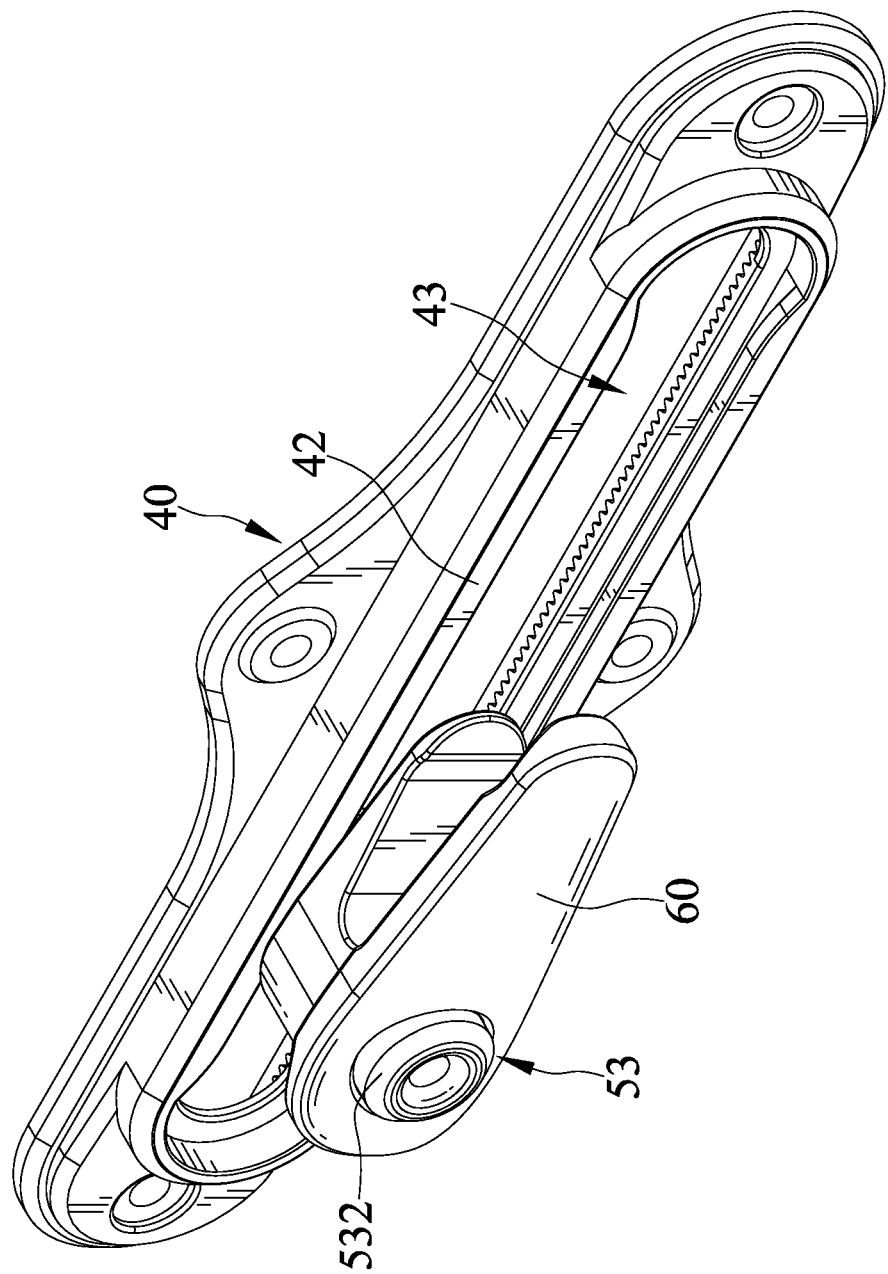
FIG. 7 is a perspective view illustrating a sliding seat, a first sliding block, and a second sliding block of a quick release buckle device for a bicycle saddle bag of an embodiment according to the present invention.
Figure 8:
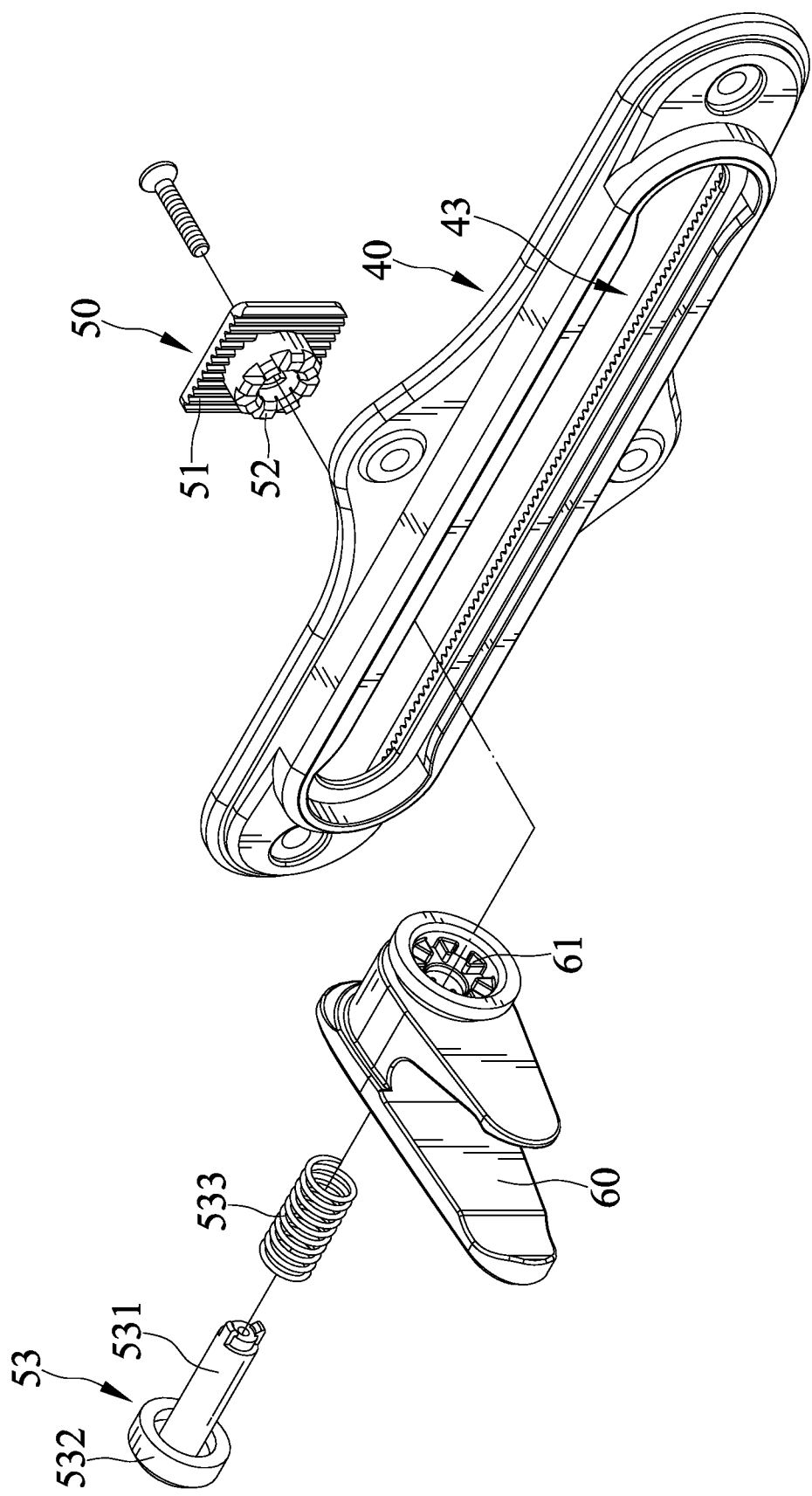
FIG. 8 is an exploded, perspective view of the quick release buckle device of FIG. 7.
Figure 9:
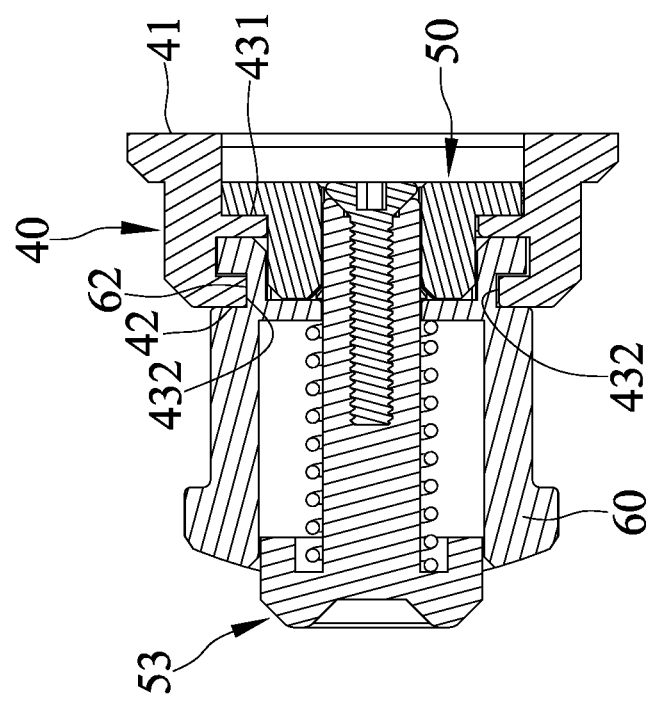
FIG. 9 is a cross sectional view of the sliding seat, the first sliding block, and the second sliding block of FIG. 7.
Figure 10:
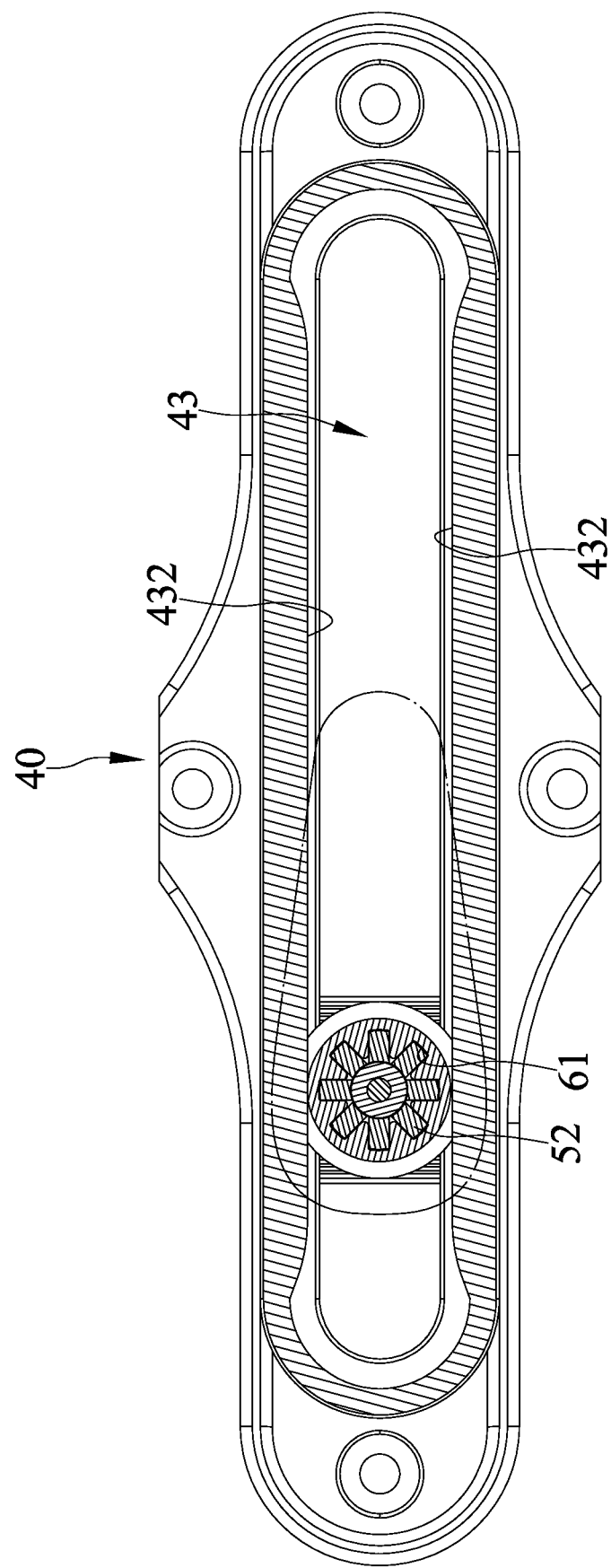
FIG. 10 is another cross sectional view of the sliding seat, the first sliding block, and the second sliding block of FIG. 7.
Figure 11:
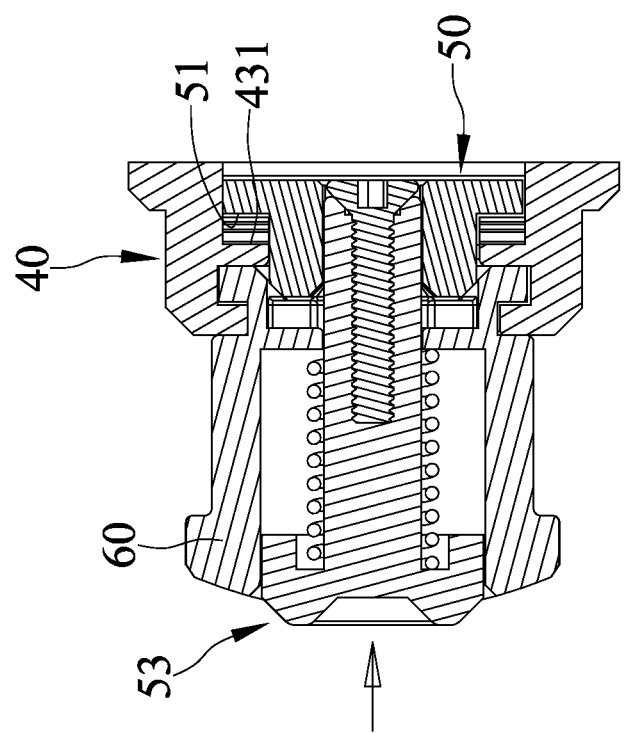
FIG. 11 is a view similar to FIG. 9 with a button pressed.
Figure 12:
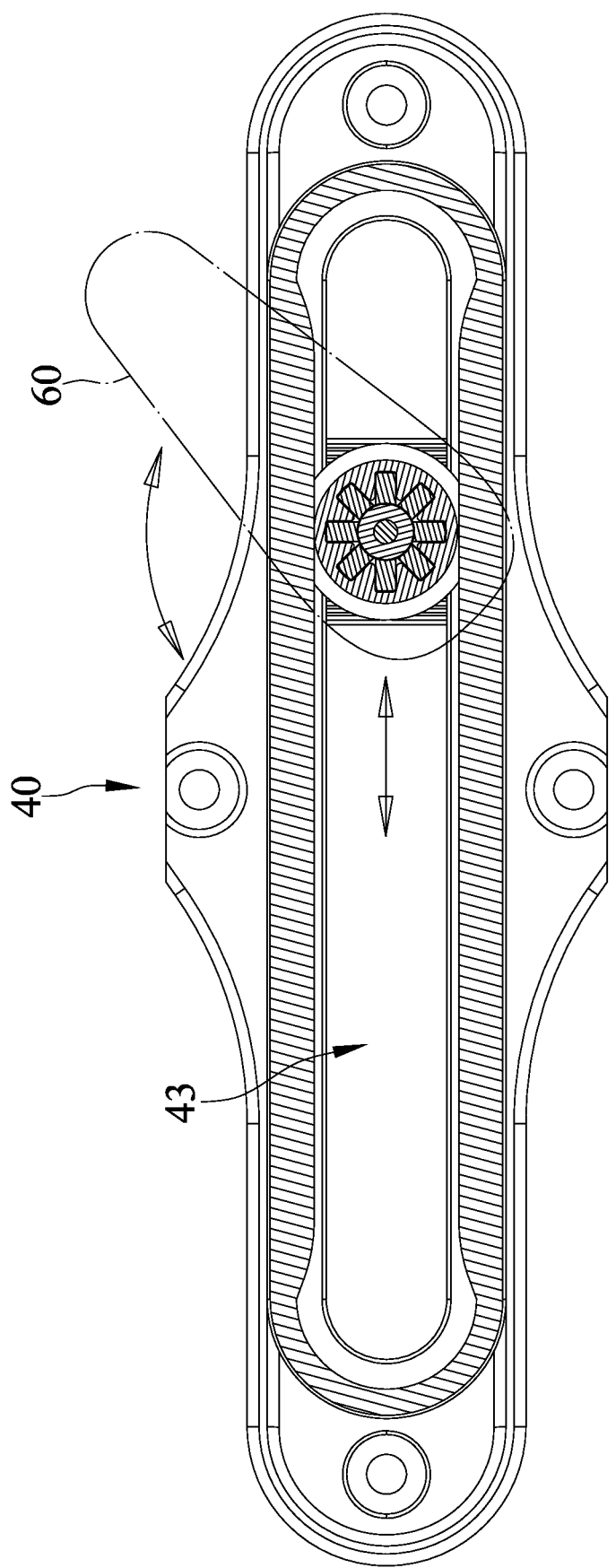
FIG. 12 is a view similar to FIG. 10 with the second sliding block slid and rotated.

With reference to FIGS. 1-6, a quick release buckle device 10 for a bicycle saddle bag of an embodiment according to the present invention comprises a hanger seat 20 and a limiting unit 30.

The hanger seat 20 includes a first pivotal portion 21. A first hook 22 includes a first end connected to the hanger seat 20 and a second end opposite to the first end. A first hanging section 23 is formed between the second end of the first hook 22 and the first pivotal portion 21.

The limiting unit 30 includes a first stopper 31 and a first pin 32. The first stopper 31 includes a first end pivotably mounted to the first pivotal portion 21 about a rotating axis L and a second end. The second end is opposite to the first pivotal portion 21, is disposed on the first hanging section 23, and is swayable between a first stop position and a first releasing position.

The first pivotal portion 21 has a first sliding groove 211. The first stopper 31 has a second sliding groove 311 at a non-parallel angle to the first sliding groove 211. The first pin 32 extends in a direction parallel to the rotating axis L and is slidably received in the first and second sliding grooves 211 and 311. The first stopper 31 is adjacent to the first hook 22 when the first stopper 31 is in the first stop position. The first stopper 31 is away from the first hook 22 when the first stopper 31 is in the first releasing position.

The first pivotal portion 21 has two first lateral boards 212 and a first pivot 213. The first stopper 31 is pivotably mounted between the two first lateral boards 212. The first pivot 213 extends along the rotating axis L and extends through the two first lateral boards 212 and the first stopper 31. The first sliding groove 211 extends through the two first lateral boards 212. The first pin 32 extends through the two first lateral boards 212.

A releasing member 24 is slidably mounted on the hanger seat 20 and is connected to the first pin 32. The first pin 32 moves together with the releasing member 24 when the releasing member 24 slides. The first stopper 31 moves to the first stop position when the first pin 32 moves to ends of the first and second sliding grooves 211 and 311 adjacent to the rotating axis L. The first stopper 31 moves to the first releasing position when the first pin 32 moves to ends of the first and second sliding grooves 211 and 311 remote to the rotating axis L.

The hanger seat 20 includes at least one return member 25 which is elastic. An end of the at least one return member 25 abuts against the hanger seat 20. Another end of the at least one return member 25 abuts against the releasing member 24. The at least one return member 25 is capable of pushing the releasing member 24 to move the first stopper 31 towards the first stop position via the first pin 32. In this embodiment, the hanger seat 20 includes two return members 25 which are elastic. An end of each of the two return members 25 abuts against the hanger seat 20. Another end of each of the two return members 25 abuts against the releasing member 24. The two return members 25 can push the releasing member 24 to move.

In this embodiment, the first sliding groove 211 extends perpendicularly to the rotating axis L, and the second sliding groove 311 is at a non-parallel angle to the longitudinal axis L.

The hanger device 20 includes a second pivotal portion 26. A second hook 27 has a first end connected to the hanger seat 20 and a second end opposite to the first end. A second hanging section 28 is formed between the second end of the second hook 27 and the second pivotal portion 26. The limiting unit 30 includes a second stopper 33 and a second pin 34. The second stopper 33 includes a first end pivotably mounted to the second pivotal portion 26 about the rotating axis L and a second end. The second end is opposite to the second pivotal portion 26, is disposed on the second hanging section 28, and is swayable between a second stop position and a second releasing position. The second pivotal portion 26 has a third sliding groove 261. The second stopper 33 has a fourth sliding block 331. The third sliding groove 261 extending perpendicularly to the rotating axis L. The fourth sliding groove 331 is at a non-parallel angle to the rotating axis L. The second pin 34 extends in a direction parallel to the rotating axis L and is slidably received in the third and fourth sliding grooves 261 and 331. The second stopper 33 is adjacent to the second hook 27 when the second stopper 33 is in the second stop position. The second stopper 33 is away from the second hook 27 when the second stopper 33 is in the second releasing position. The second pivotal portion 26 has two second lateral boards 262 and a second pivot 263. The second stopper 33 is pivotably mounted between the two second lateral boards 262. The second pivot 263 extends through the two second lateral boards 262 and the second stopper 33. The third sliding groove 261 extends through the two second lateral boards 262. The second pin 34 extends through the two second lateral boards 262. The releasing member 24 is disposed between the first and second pivotal portions 21 and 26. An end of the releasing member 24 opposite to the first pivotal portion 21 is connected to the second pin 34. The second pin 34 moves together with the releasing member 24 when the releasing member 24 slides. The second stopper 33 moves to the second stop position when the second pin 34 moves to ends of the third and fourth sliding grooves 261 and 331 adjacent to the rotating axis L. The second stopper 33 moves to the second releasing position when the second pin 34 moves to ends of the third and fourth sliding grooves 261 and 331 remote to the rotating axis L. The at least one return member 25 is capable of pushing the releasing member 24 to move the second stopper 33 towards the second stop position via the second pin 34.

The first hook 22 is connected to a first pad 221 disposed on a side of the first hook 22 adjacent to the first pivotal portion 21. An end of the first stopper 31 is connected to a second pad 312 adjacent to the first hook 22. The second hook 27 is connected to a third pad 271 disposed on a side of the second hook 27 adjacent to the second pivotal portion 26. An end of the second stopper 33 is connected to a fourth pad 332 adjacent to the second hook 27.

With reference to FIGS. 7-12, the quick release buckle device 10 according to the present invention further comprises a sliding seat 40, a first sliding block 50, and a second sliding block 60. The sliding seat 40 includes a first side 41 and a second side 42 opposite to the first side 41. The sliding seat 40 includes a slot 43 extending from the first side 41 through the second side 42. The slot 43 has a first coupling portion 431 facing the first side 41. The first sliding block 50 is slidably received in the slot 43 via the first side 41. The first sliding block 50 includes a second coupling portion 51 and a third coupling portion 52. The second coupling portion 51 releasably abuts against the first coupling portion 431. The first sliding block 50 is not movable relative to the sliding seat 40 when the second coupling portion 51 abuts against the first coupling portion 431. The first sliding block 50 is movable relative to the sliding seat 40 when the second coupling portion 51 disengages from the first coupling portion 431. The second sliding block 60 is slidably received in the slot 43 via the second side 42 and is connected to the first sliding block 50. The second sliding block 60 includes a fourth coupling portion 61 releasably abutting against the third coupling portion 52. The second sliding block 60 is not rotatable relative to the first sliding block 50 when the fourth coupling portion 61 abuts against the third coupling portion 52. The second sliding block 60 is rotatable relative to the first sliding block 50 when the fourth coupling portion 61 disengages from the third coupling portion 52.

The slot 43 includes two coupling flanges 432 protruding from two opposite sides thereof. The two coupling flanges 432 are adjacent to the second side 42. The second sliding block 60 includes an outer periphery having a coupling groove 62 therearound. The two coupling flanges 432 are disposed in the coupling groove 62.

The first sliding block 50 is connected to a button 53 extending through the second sliding block 60 and exposed beyond an end of the second sliding block 60 opposite to the first sliding block 50. When the button 53 is pressed, the second coupling portion 51 disengages from the first coupling portion 431, and the fourth coupling portion 61 disengages from the third coupling portion 52. The third coupling portion 52 is disposed on an end of the first sliding block 50 adjacent to the second sliding block 60. The third coupling portion 52 surrounds the button 53. The fourth coupling portion 61 is disposed to an end of the second sliding block 60 adjacent to the first sliding block 50. The fourth coupling portion 61 surrounds the button 53.

The button 53 includes a first end having a connecting portion 531 connected to the first sliding block 50. The button 53 includes a second end opposite to the connecting portion 531 and having a head 532. The head 532 is exposed beyond the end of the second sliding block 60 opposite to the first sliding block 50. The head 532 has a width larger than a width of the connecting portion 531. An elastic element 533 is mounted around the button 53 and has a first end abutting the second sliding block 60 and a second end abutting the head 532.

Figure 13:
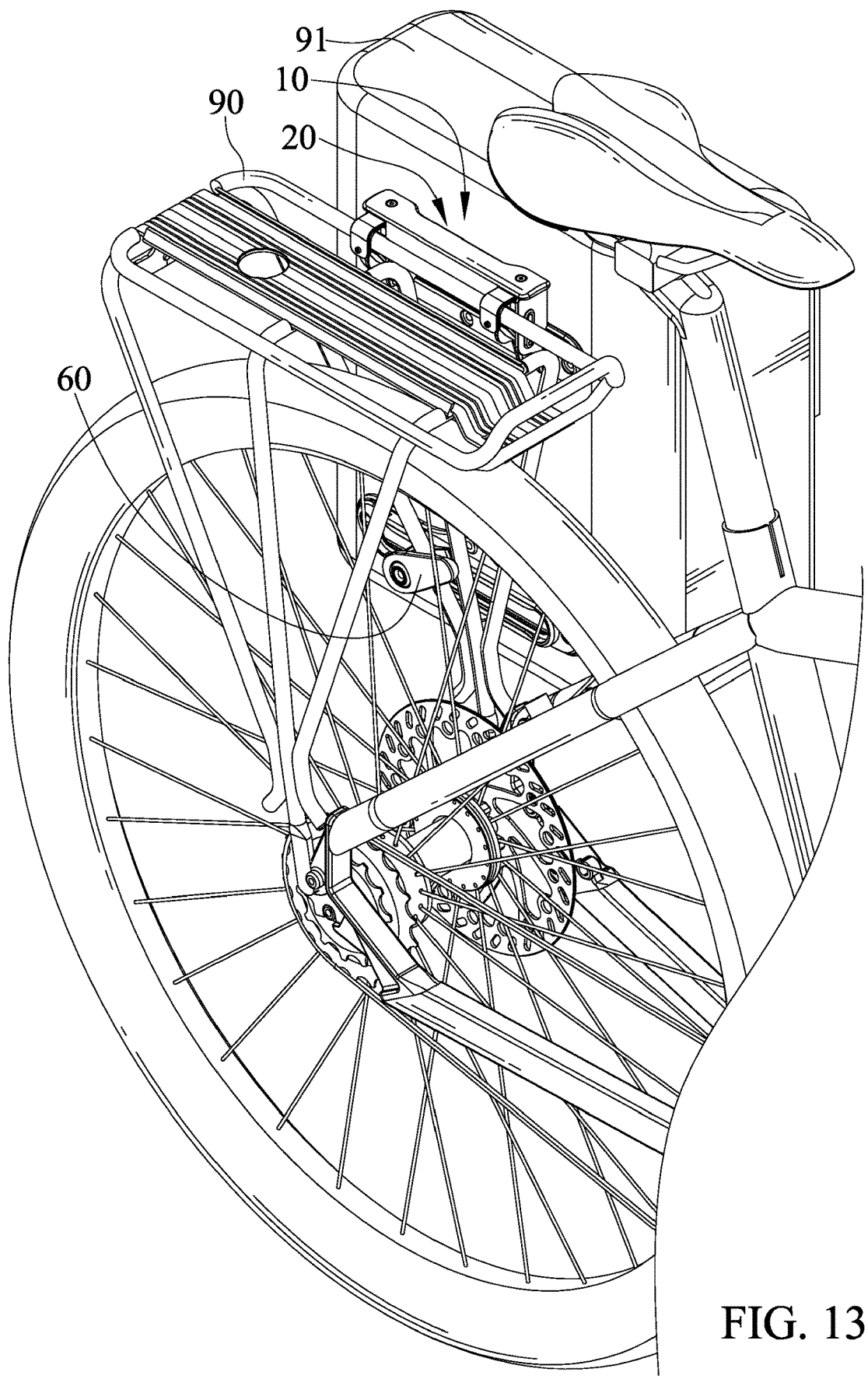
FIG. 13 is a diagrammatic perspective view illustrating use of the quick release buckle device mounted to a left side of a rack of a bicycle.
Figure 14:
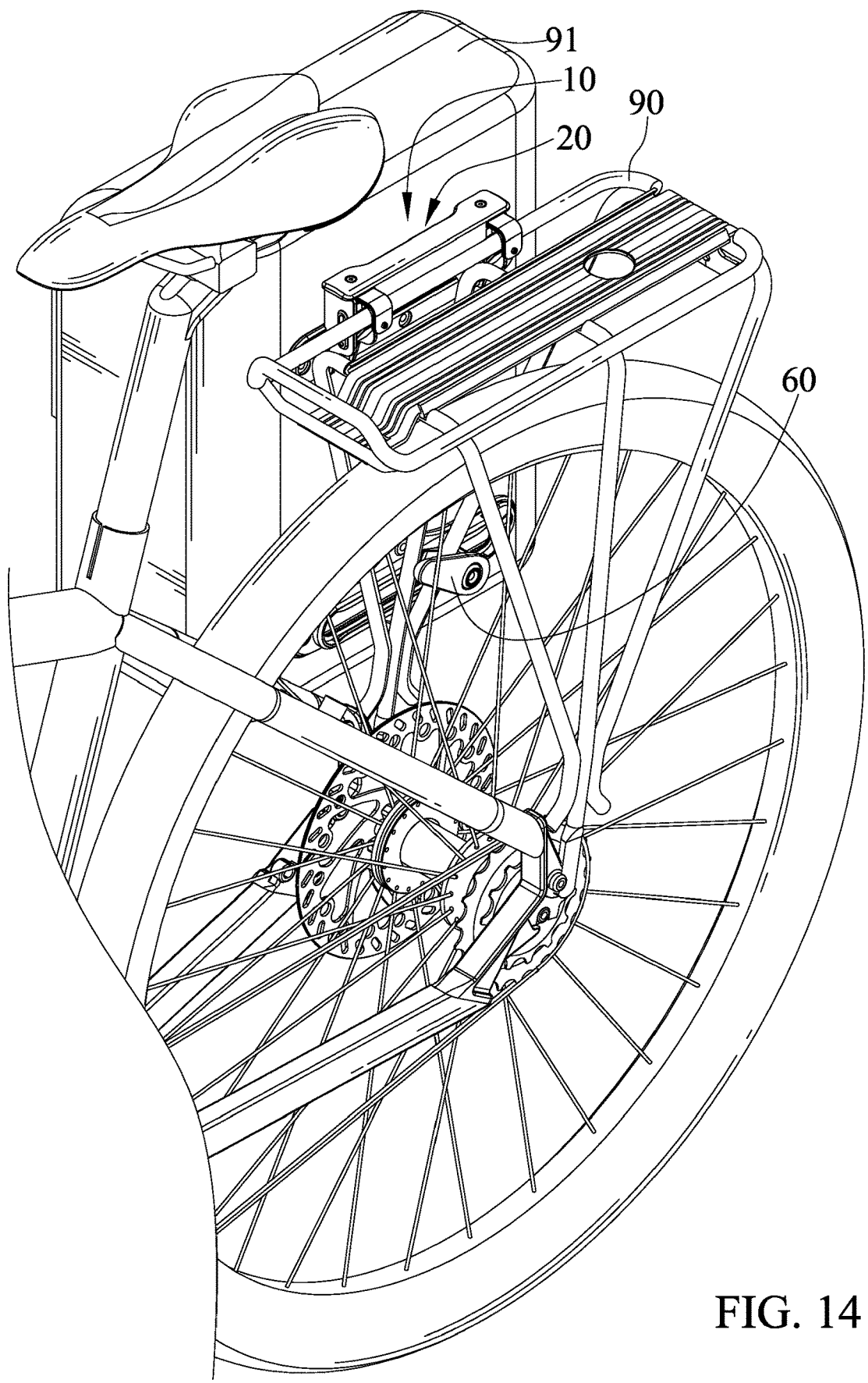
FIG. 14 is a diagrammatic perspective view illustrating use of the quick release buckle device mounted to a right side of the rack of the bicycle.

With reference to FIGS. 13 and 14, the quick release buckle device 10 for a bicycle saddle bag according to the present invention can be coupled to a left side or a right side of a rack 90 of a bicycle. The quick release buckle device 10 can be rapidly coupled to the rack 90. The hanger seat 20 can be mounted on an upper edge of a back side of a saddle bag 91. In use, the quick release buckle device 10 can be coupled with horizontal rods of the rack 90 by the first and second hanging sections 23 and 28. Furthermore, the first and second stoppers 31 and 33 can provide a stopping effect and a disengagement prevention effect. When a user is intended to remove the saddle bag 91, the releasing member 24 can be pressed to disengage the first and second stoppers 31 and 33 from the horizontal rods of the rack 90. The sliding mechanism of the first and second stoppers 31 and 33 can reliably assure sliding operations of the first and second stoppers 31 and 33.

The sliding seat 40 can be mounted to a lower edge of the back side of the saddle bag 91. The second sliding block 60 can hook on a vertical rod or an inclined rod of the rack 90, avoiding swaying of the saddle bag 91. Through rotatable movement of the second sliding block 60, the user can rotate the second sliding block 60 to a suitable angular position, such that the quick release buckle device 10 can be applied to various racks, and the saddle bag 91 can be optionally hung to the left side or the right side of the rack 90.

Although specific embodiments have been illustrated and described, numerous modifications and variations are still possible without departing from the scope of the invention. The scope of the invention is limited by the accompanying claims.

The invention claimed is:

1. A quick release buckle device for a bicycle saddle bag, comprising:
    a hanger seat including a first pivotal portion, wherein a first hook includes a first end connected to the hanger seat and a second end opposite to the first end, wherein a first hanging section is formed between the second end of the first hook and the first pivotal portion;
    a limiting unit including a first stopper and a first pin, wherein the first stopper includes a first end pivotably mounted to the first pivotal portion about a rotating axis and a second end opposite to the first pivotal portion, disposed on the first hanging section, and swayable between a first stop position and a first releasing position,
    wherein the first pivotal portion has a first sliding groove, wherein the first stopper has a second sliding groove at a non-parallel angle to the first sliding groove, wherein the first pin extends in a direction parallel to the rotating axis and is slidably received in the first and second sliding grooves, wherein the first stopper is adjacent to the first hook when the first stopper is in the first stop position, and wherein the first stopper is away from the first hook when the first stopper is in the first releasing position.

2. The quick release buckle device for the bicycle saddle bag as claimed in claim 1, wherein the first pivotal portion has two first lateral boards and a first pivot, wherein the first stopper is pivotably mounted between the two first lateral boards, wherein the first pivot extends along the rotating axis and extends through the two first lateral boards and the first stopper, wherein the first sliding groove extends through the two first lateral boards, and wherein the first pin extends through the two first lateral boards.

3. The quick release buckle device for the bicycle saddle bag as claimed in claim 2, wherein a releasing member is slidably mounted on the hanger seat and is connected to the first pin, wherein the first pin moves together with the releasing member when the releasing member slides, wherein the first stopper moves to the first stop position when the first pin moves to ends of the first and second sliding grooves adjacent to the rotating axis, and wherein the first stopper moves to the first releasing position when the first pin moves to ends of the first and second sliding grooves remote to the rotating axis.

4. The quick release buckle device for the bicycle saddle bag as claimed in claim 3, wherein the hanger seat includes at least one return member which is elastic, wherein an end of the at least one return member abuts against the hanger seat, wherein another end of the at least one return member abuts against the releasing member, wherein the at least one return member is capable of pushing the releasing member to move the first stopper towards the first stop position via the first pin.

5. The quick release buckle device for the bicycle saddle bag as claimed in claim 4, wherein the first sliding groove extends perpendicularly to the rotating axis, and wherein the second sliding groove is at a non-parallel angle to the longitudinal axis.

6. The quick release buckle device for the bicycle saddle bag as claimed in claim 5, wherein the hanger device includes a second pivotal portion, wherein a second hook has a first end connected to the hanger seat and a second end opposite to the first end, wherein a second hanging section is formed between the second end of the second hook and the second pivotal portion, wherein the limiting unit includes a second stopper and a second pin, wherein the second stopper includes a first end pivotably mounted to the second pivotal portion about the rotating axis and a second end opposite to the second pivotal portion, disposed on the second hanging section, and swayable between a second stop position and a second releasing position, wherein the second pivotal portion has a third sliding groove, wherein the second stopper has a fourth sliding block, wherein the third sliding groove extending perpendicularly to the rotating axis, wherein the fourth sliding groove is at a non-parallel angle to the rotating axis, wherein the second pin extends in a direction parallel to the rotating axis and is slidably received in the third and fourth sliding grooves, wherein the second stopper is adjacent to the second hook when the second stopper is in the second stop position, wherein the second stopper is away from the second hook when the second stopper is in the second releasing position, wherein the second pivotal portion has two second lateral boards and a second pivot, wherein the second stopper is pivotably mounted between the two second lateral boards, wherein the second pivot extends through the two second lateral boards and the second stopper, wherein the third sliding groove extends through the two second lateral boards, wherein the second pin extends through the two second lateral boards, wherein the releasing member is disposed between the first and second pivotal portions, wherein an end of the releasing member opposite to the first pivotal portion is connected to the second pin, wherein the second pin moves together with the releasing member when the releasing member slides, wherein the second stopper moves to the second stop position when the second pin moves to ends of the third and fourth sliding grooves adjacent to the rotating axis, wherein the second stopper moves to the second releasing position when the second pin moves to ends of the third and fourth sliding grooves remote to the rotating axis, and wherein the at least one return member is capable of pushing the releasing member to move the second stopper towards the second stop position via the second pin.

7. The quick release buckle device for the bicycle saddle bag as claimed in claim 6, wherein the first hook is connected to a first pad disposed on a side of the first hook adjacent to the first pivotal portion, wherein an end of the first stopper is connected to a second pad adjacent to the first hook, wherein the second hook is connected to a third pad disposed on a side of the second hook adjacent to the second pivotal portion, wherein an end of the second stopper is connected to a fourth pad adjacent to the second hook.

8. The quick release buckle device for the bicycle saddle bag as claimed in claim 7, further comprising a sliding seat, a first sliding block, and a second sliding block, wherein the sliding seat includes a first side and a second side opposite to the first side, wherein the sliding seat includes a slot extending from the first side through the second side, wherein the slot has a first coupling portion facing the first side, wherein the first sliding block is slidably received in the slot via the first side, wherein the first sliding block includes a second coupling portion and a third coupling portion, wherein the second coupling portion releasably abuts against the first coupling portion, wherein the first sliding block is not movable relative to the sliding seat when the second coupling portion abuts against the first coupling portion, wherein the first sliding block is movable relative to the sliding seat when the second coupling portion disengages from the first coupling portion, wherein the second sliding block is slidably received in the slot via the second side and is connected to the first sliding block, wherein the second sliding block includes a fourth coupling portion releasably abutting against the third coupling portion, wherein the second sliding block is not rotatable relative to the first sliding block when the fourth coupling portion abuts against the third coupling portion, wherein the second sliding block is rotatable relative to the first sliding block when the fourth coupling portion disengages from the third coupling portion.

9. The quick release buckle device for the bicycle saddle bag as claimed in claim 8, wherein the slot includes two coupling flanges protruding from two opposite sides thereof, wherein the two coupling flanges are adjacent to the second side, wherein the second sliding block includes an outer periphery having a coupling groove therearound, and wherein the two coupling flanges are disposed in the coupling groove.

10. The quick release buckle device for the bicycle saddle bag as claimed in claim 9, wherein the first sliding block is connected to a button extending through the second sliding block and exposed beyond an end of the second sliding block opposite to the first sliding block, wherein when the button is pressed, the second coupling portion disengages from the first coupling portion, and the fourth coupling portion disengages from the third coupling portion, wherein the third coupling portion is disposed on an end of the first sliding block adjacent to the second sliding block, wherein the third coupling portion surrounds the button, wherein the fourth coupling portion is disposed to an end of the second sliding block adjacent to the first sliding block, wherein the fourth coupling portion surrounds the button, wherein the button includes a first end having a connecting portion connected to the first sliding block, wherein the button includes a second end opposite to the connecting portion and having a head, wherein the head is exposed beyond the end of the second sliding block opposite to the first sliding block, wherein the head has a width larger than a width of the connecting portion, and wherein an elastic element is mounted around the button and has a first end abutting the second sliding block and a second end abutting the head.

\* \* \* \* \*